United States Patent
Tanaka

(10) Patent No.: US 7,329,206 B2
(45) Date of Patent: Feb. 12, 2008

(54) STARTING DEVICE FOR MOTOR VEHICLES

(75) Inventor: Tomohiko Tanaka, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 308 days.

(21) Appl. No.: 11/148,344

(22) Filed: Jun. 9, 2005

(65) Prior Publication Data

US 2005/0277515 A1 Dec. 15, 2005

(30) Foreign Application Priority Data

Jun. 10, 2004 (JP) ............... 2004-172345

(51) Int. Cl.
*B60W 10/02* (2006.01)
*F16H 59/64* (2006.01)

(52) U.S. Cl. .................. 477/176; 477/98

(58) Field of Classification Search ............ 477/98, 477/174, 175, 176, 72, 76; 701/57, 60, 66
See application file for complete search history.

(56) References Cited

U.S. PATENT DOCUMENTS

| | | | | |
|---|---|---|---|---|
| 4,070,927 A | * | 1/1978 | Polak | 475/286 |
| 4,660,697 A | * | 4/1987 | Yoneda et al. | 477/175 |
| 6,482,123 B2 | * | 11/2002 | Steeby | 477/98 |
| 6,645,121 B2 | * | 11/2003 | Wu et al. | 477/98 |
| 6,918,854 B2 | * | 7/2005 | Okada et al. | 477/114 |
| 7,025,708 B2 | * | 4/2006 | Rieger et al. | 477/171 |
| 7,077,783 B2 | * | 7/2006 | Senger et al. | 477/98 |

FOREIGN PATENT DOCUMENTS

| | | |
|---|---|---|
| DE | 103 16 422 A1 | 12/2003 |
| EP | 1 174 303 A2 | 1/2002 |
| EP | 1 460 317 A2 | 9/2004 |
| FR | 2 836 975 A1 | 9/2003 |
| JP | 2003-035353 A | 2/2003 |

* cited by examiner

*Primary Examiner*—Roger Pang
(74) *Attorney, Agent, or Firm*—Foley & Lardner LLP

(57) ABSTRACT

A starting device has a first friction element, a second friction element, and a control unit controlling them to change their power transmission states. The friction elements are arranged between an engine and wheels. The control unit controls the first element to produce creep torque by its slippage for creep of a motor vehicle. It includes a slip state judging means judging an excessive slip state of the first element in which it deviates from a permissible slip state, and a slip state shifting means shifting the slip state of the first element and a power transmission state of the second element so as to perform a protect control in which a slip amount of the first element decreases and the second element slips, in a case where the slip state judging means judges the excessive slip state.

20 Claims, 4 Drawing Sheets

FIG. 1

STARTING DEVICE FOR MOTOR VEHICLES

BACKGROUND OF THE INVENTION

1. Field of the Invention

The present invention relates to a starting device for motor vehicles that can provide a creep running function and a torque increase function without a torque converter.

2. Description of the Related Art

A starting device for motor vehicles of this kind is disclosed in Japanese patent laying-open publication No. 2003-35353. This starting device is composed of an auxiliary transmission arranged between an engine and a main transmission with a forward-backward shifting mechanism. The auxiliary transmission is equipped with a planetary gear set, an one-way clutch for controlling the gear set, and a hydraulically operated clutch for controlling the gear set.

The planetary gear set selectively provides a direct drive ratio and a reduction gear ratio larger than 1.00. The direct drive ratio is obtained by engaging the clutch and disengaging the one-way clutch, while the reduction gear ratio is obtained by engaging the one-way clutch and disengaging the clutch. The clutch is also capable of producing creep torque by slipping the clutch. The clutch has drive friction plates and driven friction plates and acts as a friction element. The one-way clutch acts as a brake when it is engaged. Therefore, this conventional starting device can provide a creep running function and a torque increase function, which provides functions similar to a torque converter. This enables to eliminate a torque converter, thereby bringing improvement in fuel economy and cost saving.

The above known conventional starting device, however, encounters a problem that a friction element, such as the clutch or a brake, generates heat due to slip for a smooth vehicle start and/or creep of a motor vehicle, and its caloric value sometimes exceeds a permissible value when the creeping time becomes long, causing premature deterioration and/or burnout of the friction element.

Particularly, in the conventional starting device, operation frequency is different between a forward friction element (the clutch) slipped when the vehicle creeps forward and a reverse friction element (the brake) slipped when the vehicle creeps backward, and load due to slip of the friction element in vehicle creeping is not detected for protecting it. This can not avoid the premature deterioration and/or the burnout of the friction element due to excessive load.

It is, therefore, an object of the present invention to provide a starting device for motor vehicles which overcomes the foregoing drawbacks and can produce creep torque by a slip of a friction element with suppressing premature deterioration or burnout of the friction element.

SUMMARY OF THE INVENTION

According to a first aspect of the present invention there is provided a starting device for motor vehicles comprising: a first friction element arranged between an engine and wheels; a second friction element arranged between the engine and the wheels; and a control unit that controls the first friction element and the second friction element to change from a disengagement state to a complete engagement state, the control unit capable of controlling the first friction element to produce creep torque by a slippage thereof so that the creep torque enables a motor vehicle to creep, wherein the control unit includes a slip state judging means that judges an excessive slip state of the first friction element in which the first friction element deviates from a permissible slip state, and a slip state shifting means that shifts the slip state of the first friction element and a power transmission state of the second friction element so as to perform a protect control in which a slip amount of the first friction element decreases to increase transmitting torque thereof and the second friction element slips to apply brake torque to the wheels so that the creep torque is produced by subtracting the brake torque of the second friction element from the transmitting torque of the first friction element, in a case where the slip state judging means judges the excessive slip state of the first friction element.

BRIEF DESCRIPTION OF THE DRAWINGS

The objects, features and advantages of the present invention will become apparent as the description proceeds when taken in conjunction with the accompanying drawings, in which:

FIG. 1 is a schematic diagram showing a power train that includes a continuously variable transmission with a starting device of an embodiment according to the present invention;

DETAILED DESCRIPTION OF THE PREFERRED EMBODIMENTS

Figure 2:
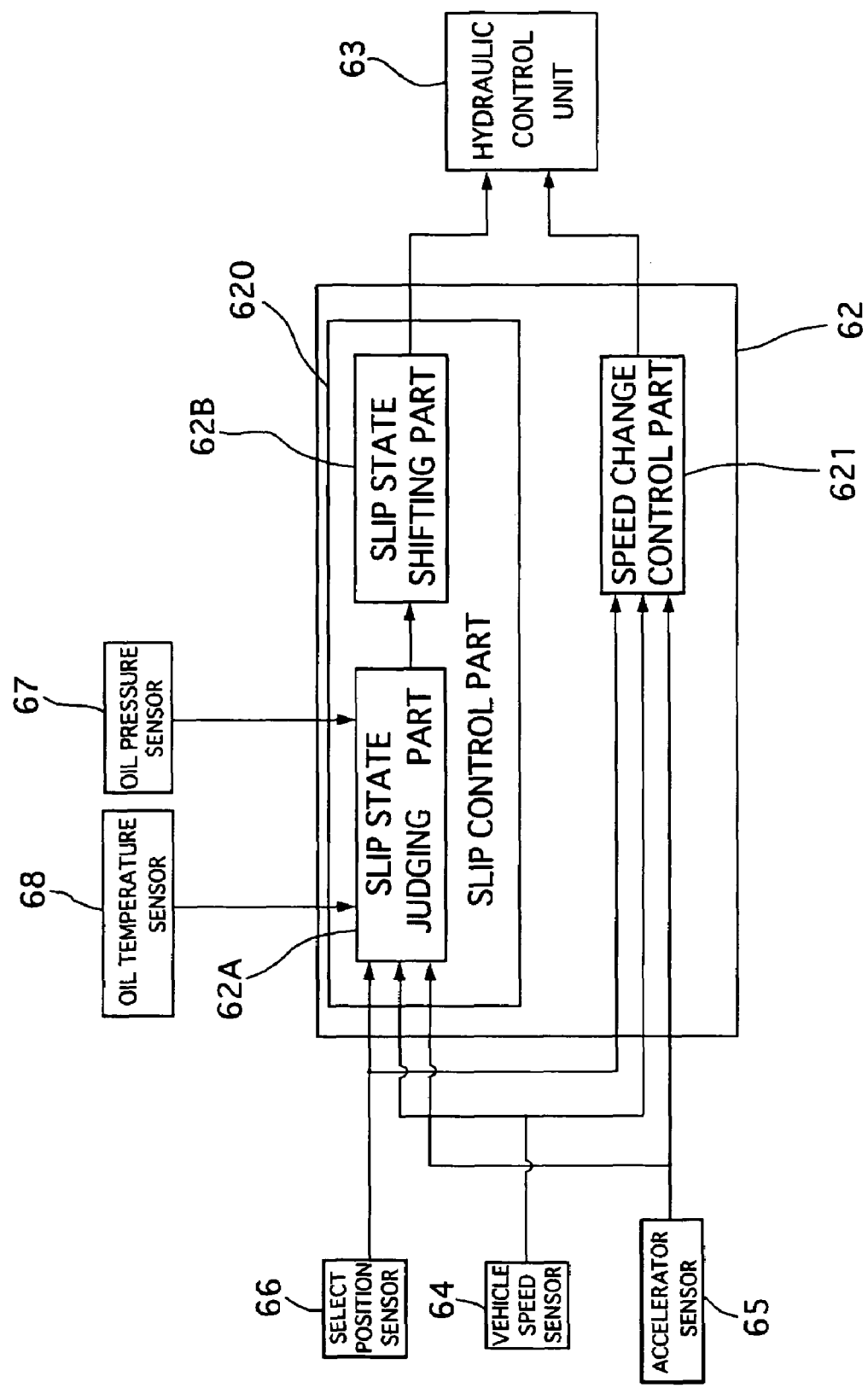
FIG. 2 is a control block diagram of a transmission control unit that controls the staring device and the continuously variable transmission shown in FIG. 1.

Throughout the following detailed description, similar reference characters and numbers refer to similar elements in all figures of the drawings, and their descriptions are omitted for eliminating duplication.

A starting device for motor vehicles of an embodiment according to the present invention will be described in detail with the accompanying drawings.

Figure 1:
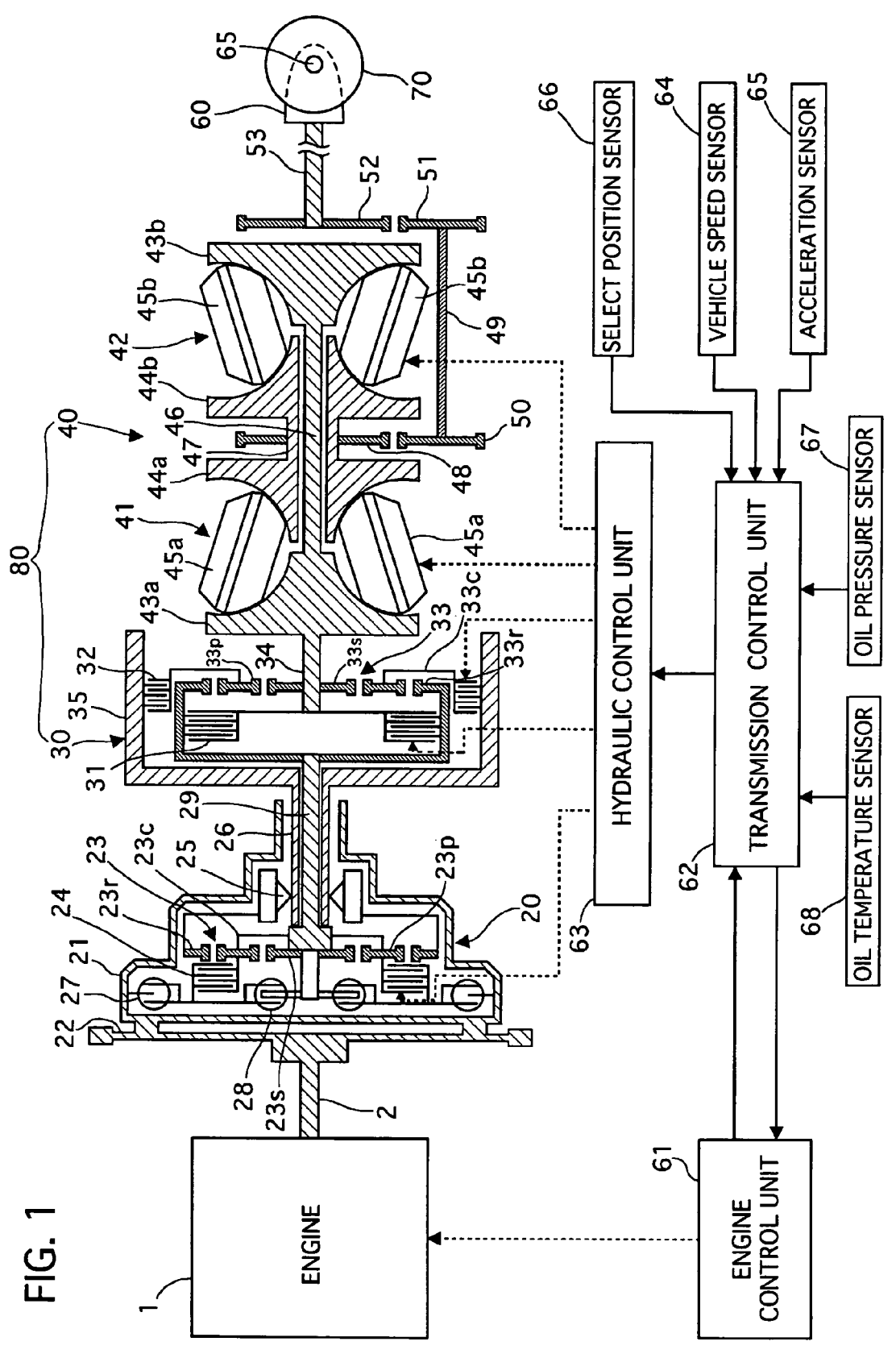

FIG. 1 shows a schematic diagram showing a power train that includes an engine 1, an auxiliary transmission 20, a continuously variable transmission (hereinafter referred to as "CVT") 80, and a final drive unit 60 with differential gears.

The auxiliary transmission 20 has a planetary gear set 23, a high speed damper 27, a low speed damper 28, a low speed clutch 24, and a one-way clutch 25.

The planetary gear set is composed of a sun gear 23$s$, a ring gear 23$r$ in coaxial with the sun gear 23$s$, pinions 23$p$ in mesh with the sun gear 23$s$ and the ring gear 23$r$ and rotatably supported by a pinion carrier 23$c$. The sun gear 23$s$ is mechanically connected with an output shaft 2 of the engine 1 through the high speed damper 27 and the low speed damper 28 at its input side and also connected with an input shaft 29 of a forward-backward shift mechanism 30 of the CVT 80. The ring gear 23$r$ is mechanically fixable to a hollow shaft 26, which is integrally formed with a transmission case 35 and contains the input shaft 29, by the one-way clutch 25 in a case where engine power is transmitted at reduced rotation speed to the hollow shaft 26, while the ring gear 23*r* is free from the hollow shaft 26 in a case where the engine power is transmitted without reduction of its rotational speed. The pinion carrier 23*c* is mechanically connectable at its input side with a connecting member between the high speed damper 27 through the high speed clutch 24 and the low speed damper 28 and at its output side connected with the input shaft 29. Accordingly, the auxiliary transmission can provide a direct drive ratio (high speed ratio) when the high speed clutch 24 engages and the one-way clutch 25 disengages and a reduction gear ratio (low speed ratio) when the clutch 24 disengages and the one-way clutch 25 engages.

The CVT 80 is a toroidal transmission used for motor vehicles, and includes the forward-backward shift mechanism 30 and a variator 40.

The forward-backward shift mechanism 30 is arranged in coaxial with the auxiliary transmission 20 and has a planetary gear set 33, a forward clutch 31, and a reverse brake 32. The planetary gear set 33 is composed of a sun gear 33*s*, a ring gear 33*r* in coaxial with the sun gear 33*s*, pinions 33*p* in mesh with the sun gear 33*s* and the ring gear 33*r* and rotatably supported by a pinion carrier 33*c*. The sun gear 33*s* is mechanically connectable at its input side with the input shaft 29 by the forward clutch 31 and at its output side with an output shaft 34 of the forward-backward shift mechanism 30. The ring gear 33*r* is mechanically connected with the input shaft 29. The pinion carrier 33*c* is fixable to the transmission case 35 by the reverse brake 32. Accordingly, the forward-backward shift mechanism 30 can provide a forward direct drive ratio when the forward clutch 31 engages and the reverse brake 32 disengages and a reverse overdrive gear ratio when the clutch 31 disengages and the brake 32 engages. The forward-backward shift mechanism 30 acts as a starting device of the present invention.

The forward clutch 31 has multi friction plates consisting of drive friction plates splined on the drive side of the clutch 31 and driven friction plates splined on the driven side of the clutch 31 so that the plates engage with each other to transmit torque between the input shaft 29 and the output shaft 34 when a not-shown piston is pressed by pressured oil supplied from the hydraulic control unit 63, while they disengages from each other to interrupt torque flow therebetween when no pressure oil is applied to the piston.

The reverse brake 32 has multi friction plates consisting of fixed side friction plates splined on an inner side of the transmission case 35 and rotatable friction plates splined on its rotatable side connected with the pinion carrier 33*c* so that the plates are engaged with each other by a not-shown piston to stop the rotatable friction plates when pressured oil is applied to the piston, and disengages from each other to allow the rotatable friction plates to rotate when no pressure oil is applied to the piston.

One of the forward clutch 31 and the reverse brake 32 acts as a first friction element of the present invention, and the other of them acts as a second friction element of the present invention, while the second friction element is not limited to the other one and may be a friction element different from them.

The variator 40 employs a half-toroidal-type one in this embodiment, and consists of a first toroidal variator 41 and a second toroidal variator 42, which are arranged in coaxial with the forward-backward shift mechanism 30 and constructed symmetrically to each other. The first toroidal variator 41 has a first input disc 43*a* connected with the output shaft 34, a first output disc 44*a*, and power rollers 45*a* contacting to toroidal surfaces of the input and output discs 43*a* and 44*a* in order to transmit drive power therebetween at a desired speed ratio. The second toroidal variator 42 has a second input disc 43*a* connected with the first input disc 43*b* by a CVT input shaft 46, a second output disc 44*b* connected with the first output disc 44*a*, and power rollers 45*b* contacting to toroidal surfaces of the input and output discs 43*b* and 44*b*. The first and second input discs 43*a* and 43*b*, and the CVT input shaft 46 are connected with the output shaft 34 of the forward-backward shift mechanism 30.

The first and second output discs 44*a* and 44*b* are provided with an output gear at their integrally connecting portion, and the output gear 48 meshes with a first transfer gear 50 connected by a transfer shaft 49 with a second transfer gear 51, which meshes with a third transfer gear 53 disposed in coaxial with. The third transfer gear 52 is connected with the final drive unit 60 through a propeller shaft 53 so that the drive power outputted from the variator 40 can drive wheels 70.

The CVT 80 is also equipped with a hydraulic control system and an electronic control system in order to control the auxiliary transmission 20, the forward-backward shift mechanism 30, and the variator 40.

The hydraulic control unit 63 contains control valves, not shown, and is fluidically connected to the high speed clutch 24, the forward clutch 31, the reverse brake 32, not-shown servos of the variator 40 in order to actuate them according to electrical signals outputted from a transmission control unit 62, respectively.

The engine 1 is controlled by an engine control unit 61 electrically connected to the transmission control unit 62 to communicate information for engine control and transmission control between them.

The transmission control unit 62 is electrically connected to a vehicle speed sensor 64 of a motor vehicle, an accelerator sensor 65 of an accelerator pedal, a select position sensor 66 of a select lever, an oil pressure sensor 67 of the CVT 80, an oil temperature sensor 68 of the CVT 80, and other sensors.

The vehicle speed sensor 64 detects a vehicle speed and outputs a vehicle speed signal to the transmission control unit 62. The acceleration sensor 65 detects an accelerator pedal position and outputs an accelerator pedal position signal to the control unit 62. The select position sensor detects a select position, such as a parking (P) position, a reverse running (R) position, a neutral (N) position, a forward drive (D) position, and a low forward drive (L) position, and outputs a select position signal to the control unit 62. The oil pressure sensor 67 detects oil pressure of oil supplied to the forward clutch 31 and the reverse brake 32 and outputs an oil pressure signal to the control unit 62. The oil temperature sensor 68 detects oil temperature of the forward clutch 31 or its vicinity and outputs an oil temperature signal to the control unit 62.

As shown in FIG. 2, the transmission control unit 62 includes a stating friction element control part 620 for controlling the forward-backward shift mechanism 30 and a speed change control part 621 for controlling the variator 40.

The stating friction element controls part 620 controls engagement and disengagement of the forward clutch 31 and the reverse brake 32 so as to provide a different transmission state: from no-power transmitting state obtained by disengagement of both of the clutch 31 and the brake 32 to completely power transmitting state obtained by engagement of one of them, including a slipping state obtained by slip of at least one of them. The stating friction element control part 620 has a slip state judging part 62A, and a slip state shifting part 62B.

The slip state judging part 62A is electrically connected to the vehicle speed sensor 64, the accelerator sensor 65, the select position sensor 66, the oil temperature sensor 67, and the oil pressure sensor 68, and judges shifting time for changing a power transmission state of the clutch 31 and the brake 32 to output a judgment signal. The slip state judging part 62A acts as a slip state judging means of the present invention.

The slip state shifting part 62B is electrically connected to the slip state judging part 62A and the hydraulic control unit 63 and outputs a slip state shift signal. The slip state shifting part 62B acts as a slip state shifting means of the present invention.

The speed change control part 621 is electrically connected to the vehicle speed sensor 64, the accelerator sensor 65, the select position sensor 66, and not-shown sensors and determines a speed ratio of the variator 40 and outputs a supply signal of pressurized oil regulated according to the speed ratio to the hydraulic control unit 63.

The operation of the power train with the starting device will be described.

When the engine 1 is stopped, a not shown oil pump can not be driven, resulting in no output of pressurized oil. Therefore, the forward clutch 31 and the reverse brake 32 are not actuated, so that the CVT 80 can not transmit power therebetween.

When the engine 1 is in operation, the pump supplies pressurized oil to the hydraulic control unit 63, and the transmission control unit 62 controls the hydraulic control unit 63 as follows.

In a case where the select lever is in non-running select position, the P position or the N position, the forward clutch 31 and the reverse brake 32 are disengaged due to discharge of oil controlled by the control units 62 and 63, so that the vehicle can not be propelled.

Conversely, in a case where the select lever is shifted from the P position or N position to the D position or the L position, or in a case where the vehicle is stopped by applying a brake and the brake is released after a vehicle's stop with the select lever being kept positioned in a forward running select position, the D position or the L position, the forward clutch 31 is supplied with pressurized oil, while the reverse brake 32 is discharged to disengage. The pressurized oil to be supplied in this case is set lower in pressure than that in a case where the clutch 31 is completely engaged so that the clutch 31 slips to enable the vehicle to creep forward. On the other hand, in a case where the select lever is shifted from the P position or N position to the R position, or in a case where the vehicle is stopped by applying the brake and the brake is released after the set time with the select lever being positioned in a backward running select position, the R position, the reverse brake 32 is supplied with pressurized oil, while the forward clutch 31 is discharged to disengage. The pressurized oil to be supplied in this case is set lower in pressure than that in a case where the brake 32 is completely engaged so that the brake 32 slips to enable the vehicle to creep backward.

Incidentally, in the cases where the engine 1 works, the output power of engine 1 is transmitted to the input shaft 29 of the forward-backward shift mechanism 30 with its vibration being damped by the high speed damper 27 and the low speed damper 28.

In a case where the vehicle is stopped by applying the brake and the brake is released within the set time with the select lever being kept in the running position, the D position, the L position, or the R position, the clutch 31 or the brake 32 is already in a state that it has been supplied with the pressurized oil so that the vehicle can creep forward or backward immediately, bringing a quick response to a driver's operation for the creep.

In the above cases, when the accelerator pedal is pressed, or when the vehicle creeps beyond a predetermined period, or when the rotational speed difference between the input shaft 29 and the output shaft 34 of the forward-backward shift mechanism 30 becomes less than a set speed, the supplied pressure oil to the one of the clutch 31 and the brake 32 is increased to have a pressure level at which it is completely engaged so that it does not slip when the vehicle is propelled to run. The above control of the clutch 31 and the brake 32 are controlled by the hydraulic control unit 63 and the slip control part 620 of the transmission control unit 62.

In this vehicle running, the speed change control part 621 continues to determine a optimum speed ratio determined based on the vehicle speed signal, the accelerator pedal position signal, the select position signal, and others, and thereby changes inclination of the power rollers 45a and 45b to change the rotational speed of the output discs 44a and 44b with respect to that of the input discs 43a and 43b of the variator 40. This changed output obtained by the variator 40 is transmitted to the wheels 70 through the final drive unit 60, and the others.

Figure 3:
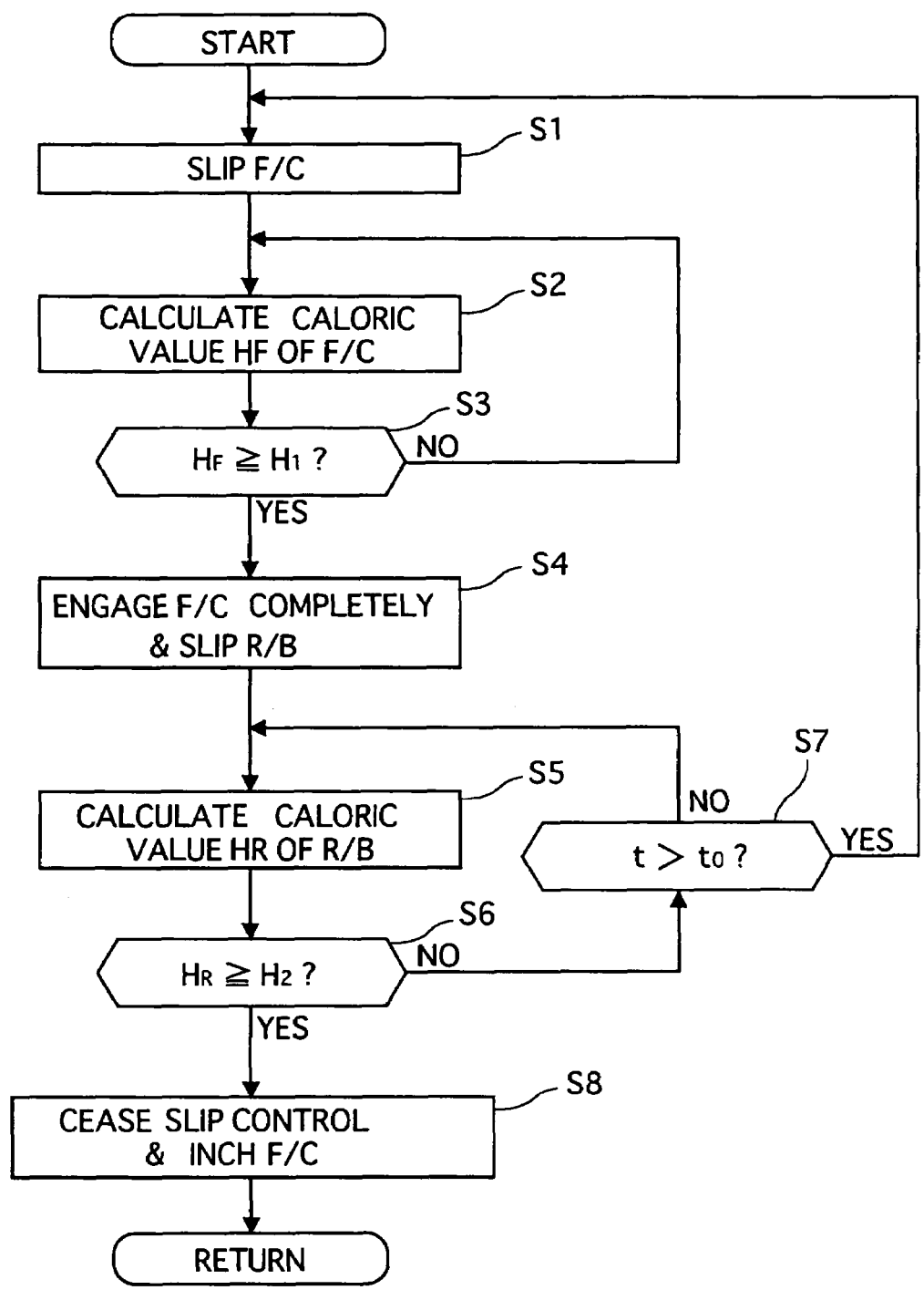
FIG. 3 is a flowchart of slip control executed in the transmission control unit shown in FIGS. 1 and 2.

The transmission control unit 40 executes the slip control according to a flowchart shown in FIG. 3.

At step S1, when the vehicle is stopped by applying a brake and the select lever is kept positioned in the D position, the slip control part 620 controls the hydraulic control unit 63 to supply reduced pressurized oil to the forward clutch 31 so that the clutch 31 can slip and produce creep torque for the vehicle to creep forward, and then the flow goes to step S2.

Figure 4:
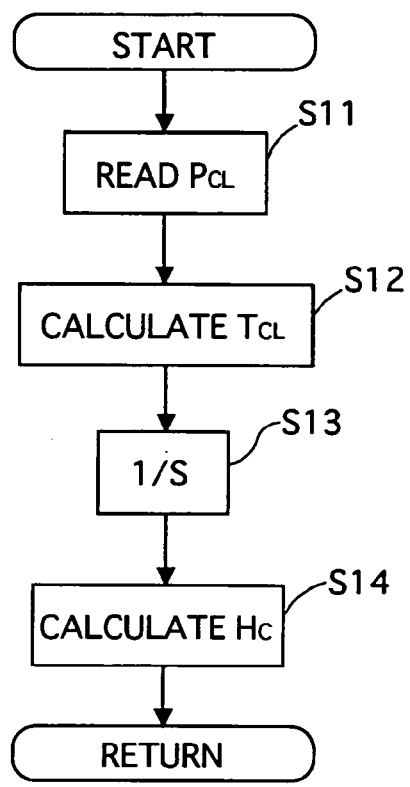
FIG. 4 is a flowchart for calculation, used in the slip control, of a calorific value generated by a forward clutch of the starting device.

At the step S2, the slip state judging part 62A calculates a caloric value $H_F$ of the clutch 31, and then the flow goes to step S3. The caloric value $H_F$ is calculated as follows. FIG. 4 is a subroutine flowchart executed in the step S2 for calculation of the caloric value $H_F$. At step S11, the judging part 62A receives an oil pressure signal to read oil pressure $P_{CL}$ of oil supplied to the clutch 31 and then the flow goes to step S12. At the step S12, engaging torque $T_{CL}$ of the clutch 31 is computed based on the oil pressure signal, and then the flow goes to step S13. At the step S13, the engaging torque $T_{CL}$ is integrated with respect to time, and then the flow goes to step S14. At the step the S14, the caloric value $H_F$ is calculated based on the integration of the engaging torque $T_{CL}$ obtained at the step S13, and the flow returns to the step S2 of FIG. 3.

At the step S3, the judging part 62A judges whether or not the caloric value $H_F$ calculated at the step S2 is equal to or larger than a first threshold value $H_1$, and if YES, the flow goes to step S4, while if NO, the flow returns to the step S2. The first threshold value $H_1$ is set in advance based on a value that is obtained by computation or by an experiment in view of deterioration and the like of the clutch 31. The above power transmission state, in which the first friction element deviates from a permissible slip state, of the first friction element (the clutch 31 in this embodiment) corresponds to an excessive slip state of the present invention.

At the step S4, the slip state shifting part 62B receives a judgment signal from the judging part 62A and outputs a shift signal to the hydraulic control unit 63 to supply high pressure oil to the clutch 31 and low pressure oil to the brake 32 so that the clutch 31 is completely engaged and the brake 32 slips, and then the floe goes to step S5. This complete engagement of the clutch 31 brings it to generate no more heat due to the slip of the clutch 31, and accordingly it is cooled down. At a time, the brake 32 slips to apply brake force to the pinion carrier 33c and decreases output torque of the output shaft 34 of the forward-backward shift mechanism 30, thereby the mechanism 30 providing creep torque continuously. The control executed at the step S4 corresponds to a protect control of the present invention. In this protect control, a slip amount of the first friction element decreases and the second friction element (the brake 32 in this embodiment) slips, in a case where the slip state judging part 62A judges the excessive slip state of the first friction element.

At the step S5, the judging part 62A calculates a caloric value $H_R$ of the brake 32 based on oil pressure supplied to the brake 32, and then the flow goes to step S6. The caloric value $H_R$ is calculated by a computation similar to that of the clutch 31: detecting oil pressure supplied to the brake 32 by the oil pressure sensor 68, and then its engaging torque is computed by using the oil pressure. The engaging torque is integrated with respect to time, and the caloric value $H_R$ is calculated based on the integration.

At the step S6, the judging part 62A judges whether or not the caloric value HR is equal to or larger than a second threshold value $H_2$, and if YES, the flow goes to step S8, while if NO, the flow goes to step S7. The second threshold value H2 is set in advance based on a value that is obtained by computation or by an experiment in view of deterioration and the like of the brake 32.

Figure 5:
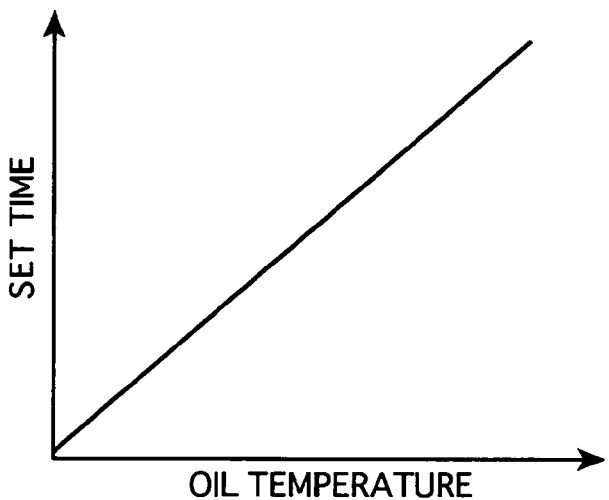
FIG. 5 is a characteristic diagram showing a relationship between an oil temperature and set time for a restart of slipping the friction element.
Figure 6:
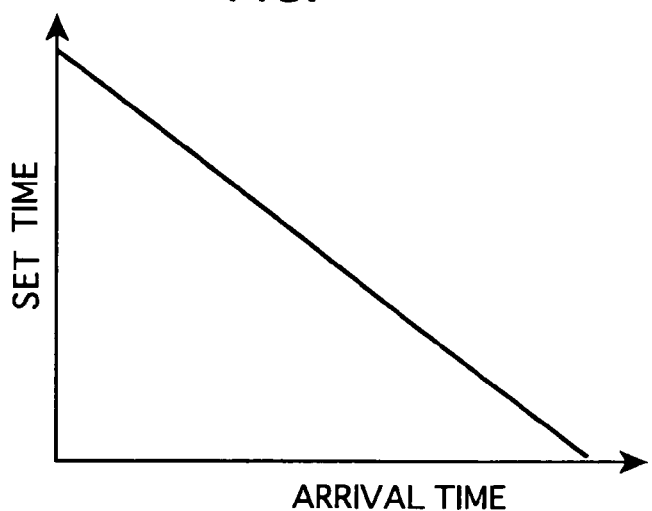
FIG. 6 is a characteristic diagram showing a relationship between arrival time for a caloric value for the friction element to reach a predetermined value and the set time for the restart of slipping the friction element.

At the step S7, the judging part 62A judges whether or not time t after the brake 32 starts to slip exceeds set time to, changeable according to oil temperature of the clutch 31 or its vicinity and/or arrival time for the clutch 31 to have a predetermined caloric value, and if YES, the flow returns to the step S1, while if NO, the flow returns to the step S5. The set time to is set in advance based on a period that is obtained by computation or by an experiment so that the clutch 31 can be sufficiently cooled down. The set time to is set longer as the oil temperature detected by the oil temperature sensor 68 becomes higher as shown in FIG. 5. The set time to is also set longer as the arrival time becomes shorter as shown in FIG. 6.

At the step S8, the slip state shifting part 62B controls the hydraulic control unit 63 to rapidly change oil pressure to be supplied to the clutch 31 in a short time so that creep of the vehicle by the clutch 31 is ceased and the clutch 31 is controlled to be inched. "The clutch is controlled to be inched", hereinafter, means that the clutch is controlled so that engagement and disengagement of the clutch is repeated alternatively in a short period of time.

Although the flowchart of FIG. 3 illustrates slip control in a case where the vehicle moves forward, the slip control in a case where it moves backward is similarly, except that the brake 32 slips for obtaining creep torque, but it is engaged completely and the clutch 31 slips when its caloric value reaches a predetermined value.

The starting device of the embodiment has the following advantages.

It can produce creep torque for creep of a motor vehicle without a torque converter, resulting in improvement in fuel economy and cost saving. In addition, it can provide a favorable restart response by using creep torque in a case where the vehicle is stopped with the select lever being kept positioned in a running select position.

The first friction element (one of the clutch 31 or the brake 32) is controlled so that it is engaged completely to stop its slip and the second friction element (the other of the clutch 31 and the brake 32) slips when the caloric value of the first friction element is not less than the first threshold value, which can prevent premature deterioration and/or burnout of the first friction element, bringing improvement in its durability by reducing heat load on it.

When time after the first friction element is engaged completely and the second friction slips becomes equal to or larger than the set time, the first friction element starts to slip and the second friction element is released. By this slip control, the first and second friction elements share heat load with each other, preventing load bias toward one of them to suppress premature deterioration of the both elements. In addition, it can continue to produce creep torque by using the second friction element.

The set time is set according to an oil temperature of the first friction element or its vicinity and also set according to arrival time for the first friction element to have the predetermined caloric value, which enables the first friction element to be cooled down at a temperature where the first friction element can slip again to produce creep torque without its premature deterioration and/or burnout.

The creep control for moving the vehicle is ceased and the first friction clutch is inched when the caloric value of the second friction element becomes equal to or larger than the second threshold before the time after the first friction element is engaged completely and the second friction slips reaches the set time, which can prevent the both of the friction elements from excessive heat load, and accordingly suppressing its premature deterioration and/or burnout.

The caloric value generated by the first and second friction elements are calculated by detection of oil pressure supplied to the friction elements, computation of engaging torque based on the oil pressure, and the integration of the engaging torque, which can decrease a manufacturing cost and avoid an additional weight, because a special sensor for detecting a caloric value of the friction elements is not necessary.

While the invention has been particularly shown and described with reference to preferred embodiments thereof, it will be understood by those skilled in the art that the foregoing and other changes in form and details can be made therein without departing from the spirit and scope of the invention.

A transmission used in the invention is not limited to the above-described toroidal type CVT of the embodiment, and may employ a belt type CVT, or other type transmissions equipped with gears for example.

A first friction element for producing creep torque may be arranged at any one of an upstream side and a downstream side of the variator 40.

A second friction element may be a friction element used in the forward-backward shifting mechanism 30.

A first and second friction elements may be constructed to have only one friction plate instead of multi friction plates of the embodiment and actuated or released by control force that is not produced by oil pressure.

The entire contents of Japanese Patent Application No. 2004-172345 filed Jun. 10, 2004 is incorporated herein by reference.

What is claimed is:
1. A starting device for a motor vehicle comprising:
a first friction element arranged between an engine and wheels;

a second friction element arranged between the engine and the wheels; and a control unit that controls the first friction element and the second friction element to change from a disengagement state to a complete engagement state, the control unit being capable of controlling the first friction element to produce creep torque by a slippage thereof so that the creep torque enables a motor vehicle to creep, wherein the control unit includes a slip state judging device that judges an excessive slip state of the first friction element in which the first friction element deviates from a permissible slip state, and a slip state shifting device that shifts a slip state of the first friction element and a power transmission state of the second friction element so as to perform a protect control in which a slip amount of the first friction element decreases to increase transmitting torque thereof and the second friction element slips to apply brake torque to the wheels so that the creep torque is produced by subtracting brake torque of the second friction element from the transmitting torque of the first friction element, in a case where the slip state judging device judges the excessive slip state of the first friction element.

2. The starting device according to claim 1, wherein the slip state judging device judges the excessive slip state of the first friction element when a caloric value of the first friction element is not less than a first threshold value.

3. The starting device according to claim 2, wherein the slip state shifting device ceases the protect control in a case where the slip state judging device judges that time after the protect control starts is longer than a set time and a caloric value of the second friction element is less than a second threshold value.

4. The starting device according to claim 2, wherein the slip state shifting device decreases a slip amount of the second friction element and inches the first friction element in a case where the slip state judging device judges that time after the protect control starts is within a set time and a caloric value of the second friction element is not less than a second threshold value.

5. The starting device according to claim 2, wherein the caloric value is calculated by using an oil pressure applied to the first friction element in the slip state and engaging torque of the first friction element.

6. The starting device according to claim 2, wherein one of the first friction element and the second friction element is a forward clutch and the other of the first friction element and the second friction element is a reverse brake.

7. The starting device according to claim 1, wherein one of the first friction element and the second friction element is a forward clutch and the other of the first friction element and the second friction element is a reverse brake.

8. A starting device for a motor vehicle comprising:
a first friction element arranged between an engine and wheels;
a second friction element arranged between the engine and the wheels; and
a control unit that controls the first friction element and the second friction element to change from a disengagement state to a complete engagement state, the control unit being capable of controlling the first friction element to produce creep torque by a slippage thereof so that the creep torque enables a motor vehicle to creep, wherein the control unit includes a slip state judging device that judges an excessive slip state of the first friction element in which the first friction element deviates from a permissible slip state, and a slip state shifting device that shifts a slip state of the first friction element and a power transmission state of the second friction element so as to perform a protect control in which a slip amount of the first friction element decreases and the second friction element slips, in a case where the slip state judging device judges the excessive slip state of the first friction element, wherein the slip state shifting device ceases the protect control in a case where the slip state judging device judges that a time after the protect control starts is longer than a set time and a caloric value of the second friction element is less than a first threshold value.

9. The starting device according to claim 8, wherein the slip state shifting device decreases a slip amount of the second friction element and inches the first friction element in a case where the slip state judging device judges that the time after the protect control starts is within a second set time and the caloric value of the second friction element is not less than a second threshold value.

10. The starting device according to claim 8, wherein the set time is set to become longer as an oil temperature in a vicinity of the first friction element becomes higher.

11. The starting device according to claim 8, wherein the set time is set to become longer as an arrival time of at least one of the friction elements becomes shorter where a caloric value of the first friction element becomes not less than a second threshold value.

12. The starting device according to claim 8, wherein the caloric value is calculated by using an oil pressure applied to the second friction element in a slip state and is based on an engaging torque of the second friction element.

13. The starting device according to claim 11, wherein the caloric value is calculated by using an oil pressure applied to the first friction element in the slip state and is based on an engaging torque of the first friction element.

14. The starting device according to claim 8, wherein one of the first friction element and the second friction element is a forward clutch and the other of the first friction element and the second friction element is a reverse brake.

15. A starting device for a motor vehicle comprising:
a first friction element arranged between an engine and wheels;
a second friction element arranged between the engine and the wheels; and
a control unit that controls the first friction element and the second friction element to change from a disengagement state to a complete engagement state, the control unit being capable of controlling the first friction element to produce creep torque by a slippage thereof so that the creep torque enables a motor vehicle to creep, wherein the control unit includes a slip state judging device that judges an excessive slip state of the first friction element in which the first friction element deviates from a permissible slip state, and a slip state shifting device that shifts a slip state of the first friction element and a power transmission state of the second friction element so as to perform a protect control in which a slip amount of the first friction element decreases and the second friction element slips, in a case where the slip state judging device judges the excessive slip state of the first friction element, wherein the slip state shifting device decreases a slip amount of the second friction element and inches the first friction element in a case where the slip state judging device judges that a time after the protect control starts is within a set time and a caloric value of the second friction element is not less than a first threshold value.

16. The starting device according to claim 15, wherein the set time is set to become longer as an oil temperature in a vicinity of the first friction element becomes higher.

17. The starting device according to claim 15, wherein the set time is set to become longer as an arrival time of at least one of the friction elements becomes shorter where a caloric value of the first friction element becomes not less than a second threshold value.

18. The starting device according to claim 15, wherein the caloric value is calculated by using an oil pressure applied to the second friction element in a slip state and is based on an engaging torque of the second friction element.

19. The starting device according to claim 17, wherein the caloric value is calculated by using an oil pressure applied to the first friction element in a slip state and is based on an engaging torque of the first friction element.

20. The starting device according to claim 15, wherein one of the first friction element and the second friction element is a forward clutch and the other of the first friction element and the second friction element is a reverse brake.

* * * * *